Patented Feb. 9, 1937

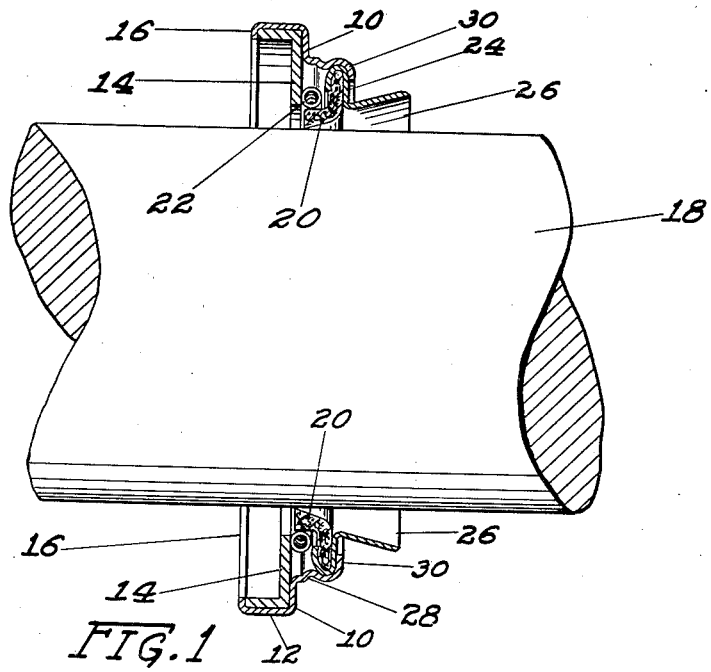
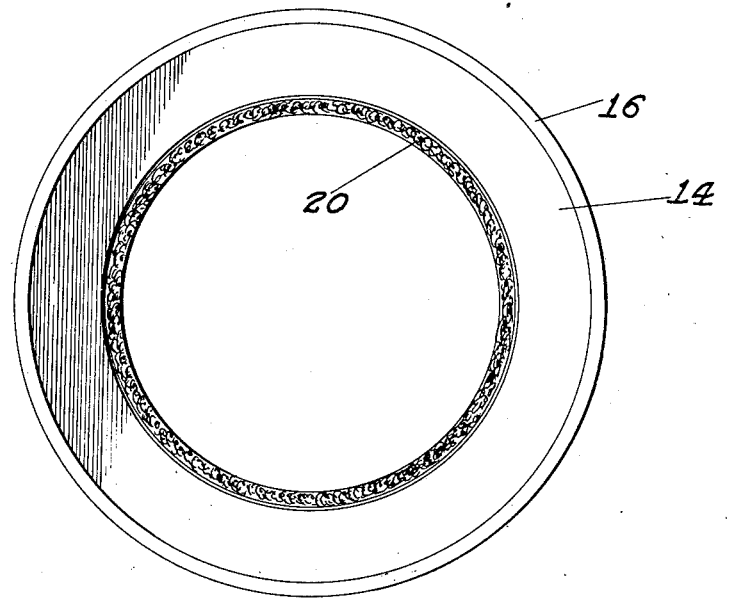

2,070,126

UNITED STATES PATENT OFFICE 2,070,126

GREASE RETAINER WITH OIL SPLASHER

William A. Heinze, Chicago, Ill., assignor to Victor Manufacturing & Gasket Company, Chicago, Ill., a corporation of Illinois Application March 8, 1935, Serial No. 10,054

4 Claims. (Cl. 288—1)

This invention relates to an improved grease retainer with oil splasher, and has for one of its principal objects a provision of means for sealing oil or grease in a housing about a rotating shaft, and which, at the same time, includes what is known as an oil splash ring.

One of the important objects of this invention is to provide an oil seal for rotating shafts, such as automobile axles or the like, and which, in addition to sealing the oil inside of the housing and preventing leakage therefrom, either around the shaft or between the seal and the housing, will also act to prevent the flowing or splashing of any oil or grease which might be on the other side of the seal and on the shaft, or which, due to some untoward circumstance, might possibly leak through the seal.

A still further object of the invention is to provide a grease retainer with an oil splasher, which oil splasher is integral with the structure of the grease retainer, and which device as a whole, is composed of a minimum of parts, while at the same time affording a satisfactory and efficient construction.

Another and still further important object is to provide a grease retainer or oil seal which shall include a pliant diaphragm of leather or the like, with means for normally holding a portion of the same against a rotating shaft in sealing relationship therewith, a mounting for the diaphragm, and a reinforcing means in the mounting which will allow the same to be driven or pressed into an oil-tight relationship with the housing.

Other and further important objects of the invention will be apparent from the disclosures in the accompanying drawing and following specification.

The invention, in a preferred form, is illustrated in the drawing and hereinafter more fully described.

In the drawing:

Figure 1 is a sectional view of the improved grease retainer with integral splash ring of this invention, showing the same as fitted on a rotatable shaft.

Figure 2 is an end view of the grease retainer, showing the same as removed from the shaft.

As shown in the drawing:

The reference numeral 10 indicates generally the containing shell or housing of the improved grease retainer of this invention, the same preferably comprising an open cup-shaped element, preferably composed of sheet steel or the like, which can be drawn or stamped into desired shape, and which can also be worked after an original shaping, so as to produce a finished device in conjunction with other associated parts.

The housing is shaped as shown in the cross-section, with an outer periphery or rim 12 adapted to embrace a reinforcing element, preferably in the shape of a washer 14, L-shaped in cross-section, as illustrated, which washer is of heavier material than the material of the shell, but preferably of the same metal, such as cold rolled sheet steel.

The washer is made heavier so as to reinforce the entire structure and also to provide a good pressed or driven fit against the interior of the axle housing, into which it is adapted to be inserted. It will be noted that the washer and shell are joined together by spinning or turning down the outer edge 16 of the rim 12 about the outwardly faced edge or portion of the reinforcing washer 14, and it will further be noted that the washer 14 is of a larger inside diameter than the outside diameter of the shaft 18, so that there will not at any time be any contact between the washer 14 and the shaft.

Also positioned in the housing or shell 10 is a pliant diaphragm 20, preferably of leather, L-shaped in cross-section, as shown, having one flange adapted to be held in wiping or oil-sealing relationship with the shaft 18 by means of a constricting element such as a garter spring or the like 22.

The leather or other diaphragm is held in position in the shell and also against the shaft by preliminarily mounting the same in an armor or holder 24, which armor has integral therewith the oil splash ring 26, as illustrated.

The armor or holder is shaped as shown, and has one inner edge turned down and clamped against the periphery of the leather diaphragm 20 so as to securely hold the same.

The annular bead 28 is preliminarily formed in the shell 10, against which the periphery on the armor 24 rests when the same is inserted into the shell, and the edge 30 of the shell is then bent or spun down against the armor 24 into the position shown in Figure 1, so as to provide a completed structure. In addition to securely gripping the armored leather 20—24, the action of the inturned flange 30, in conjunction with the inwardly directed annular bead or rim 28, is such that undesirable rotation of the armored leather and its splash ring 26 is effectively prevented.

It will be seen that herein is provided an oil seal or grease retainer having an attached or practically integral splash ring which is simple of construction, composed of a minimum number of parts, and which, on account of its double-acting features, will be highly satisfactory in operation.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A grease retainer comprising an outer shell, a reinforcing washer therein, a pliant diaphragm in the shell and a mounting for the diaphragm, said mounting comprising an armor positioned against one face of the diaphragm, and an oil splash ring integral with the armor and extending beyond the shell.

2. A grease retainer comprising an outer shell, a pliant diaphragm in the shell and a mounting for the diaphragm, said mounting comprising an armor positioned against one face of the diaphragm and an oil splash ring integral with the armor, said oil splash ring extending outwardly beyond the shell, the inner end of the armor being turned into clinching engagement with the diaphragm.

3. A grease retainer comprising an outer shell, a pliant diaphragm in the shell and a mounting for the diaphragm, said mounting comprising an armor positioned against one face of the diaphragm and an outwardly flared oil splash ring integral with the armor, said oil splash ring extending outwardly beyond the shell, the inner end of the armor being turned into clinching engagement with the diaphragm about its periphery.

4. A grease retainer comprising an outer open-ended shell, having an offset shoulder and an annular bead formed in the offset, a reinforcing washer positioned against the shoulder, an inturned flange at one edge of the shell for fixing said reinforcing washer in position, an armored pliant diaphragm positioned against the said annular bead, said armor including an integral outwardly flared splash ring and an inturned flange at the corresponding end of the shell for fixing said armored diaphragm and splash ring in desired position in the shell.

WILLIAM A. HEINZE.